(12) United States Patent
Lyakh et al.

(10) Patent No.: US 7,562,278 B2
(45) Date of Patent: Jul. 14, 2009

(54) INCREMENTAL FORWARD ERROR CORRECTION REDUNDANCY

(75) Inventors: Mikhail Lyakh, Novgorod (RU); Konstantin Zakharchenko, Dnepropetrovsk region (RU)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 11/321,435

(22) Filed: Dec. 29, 2005

(65) Prior Publication Data

US 2007/0157069 A1 Jul. 5, 2007

(51) Int. Cl.
*H03M 13/00* (2006.01)
*H04L 1/18* (2006.01)
*H04L 1/14* (2006.01)
*G08C 25/02* (2006.01)

(52) U.S. Cl. .................. 714/751; 714/748; 714/749; 714/750

(58) Field of Classification Search .......... 714/748–751
See application file for complete search history.

(56) References Cited

U.S. PATENT DOCUMENTS

| | | | | |
|---|---|---|---|---|
| 6,633,856 | B2 * | 10/2003 | Richardson et al. | 706/15 |
| 6,678,523 | B1 * | 1/2004 | Ghosh et al. | 455/442 |
| 7,027,782 | B2 * | 4/2006 | Moon et al. | 455/102 |
| 7,058,407 | B2 * | 6/2006 | Chi et al. | 455/449 |
| 7,076,718 | B2 * | 7/2006 | Miyoshi | 714/748 |
| 7,139,959 | B2 * | 11/2006 | Hocevar | 714/752 |
| 7,178,080 | B2 * | 2/2007 | Hocevar | 714/752 |
| 7,289,567 | B2 * | 10/2007 | Classon et al. | 375/260 |
| 2002/0159384 | A1 * | 10/2002 | Classon et al. | 370/216 |
| 2006/0123318 | A1 * | 6/2006 | Kim et al. | 714/758 |

\* cited by examiner

*Primary Examiner*—Joseph D Torres
(74) *Attorney, Agent, or Firm*—Dana B. Lemoine; Lemoine Patent Services, PLLC (57) ABSTRACT

A data frame includes multiple data blocks that are block encoded in a forward error correction (FEC) scheme. When received data blocks are corrupted, encoded versions of the data blocks are stored, and retransmission of the corrupted data blocks is requested. Upon receiving retransmitted data blocks, the retransmitted encoded data blocks are combined with stored encoded data blocks prior to decoding.

5 Claims, 6 Drawing Sheets

INCREMENTAL FORWARD ERROR CORRECTION REDUNDANCY

FIELD

Various embodiments described herein relate to communications generally, including apparatus, systems, and methods used to transmit and receive information via wireless networks and other communication channels.

BACKGROUND

In a digital communications system, a source device may send information to destination device according to a frame-based data transmission protocol. Because the communication channel may be noisy and unreliable, the data transmission protocol may implement a frame exchange protocol to allow the source device to determine whether a sent frame has been successfully received at the destination device. The protocol may include two frames: 1) a sent frame that includes a frame sent from the source device to the destination device; and 2) a response frame that includes an acknowledgment (ACK) from the destination device that the sent frame was received correctly.

To enable the destination device to determine whether a frame is received correctly, the source device may encode and send a frame check sequence, and possibly a header check sequence, along with the sent frame. If the destination device's evaluation of the frame check sequence and the header check sequence indicates that the sent frame was received correctly, then the destination device may sent an ACK frame to the source device. If the evaluation indicates that the sent frame was received with errors, then the destination device may refrain from sending the ACK frame. In this case, upon the expiration of an acknowledgment timer, the source device may retransmit the entire sent frame to the destination device. The retransmission method may result in more robust communications. However, for severely compromised channels, retransmissions also may consume significant amounts of system bandwidth, particularly for communications that include relatively large frames.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Various embodiments of the inventive subject matter, describe below, include apparatus and ways of communicating data frames in a robust manner. Various embodiments may be implemented in systems and devices such as the system and device described in conjunction with FIGS. 1 and 2. Various embodiments also can be implemented in other systems and devices, which have different configurations, as will be apparent to those of skill in the art, based on the description herein.

Figure 1:
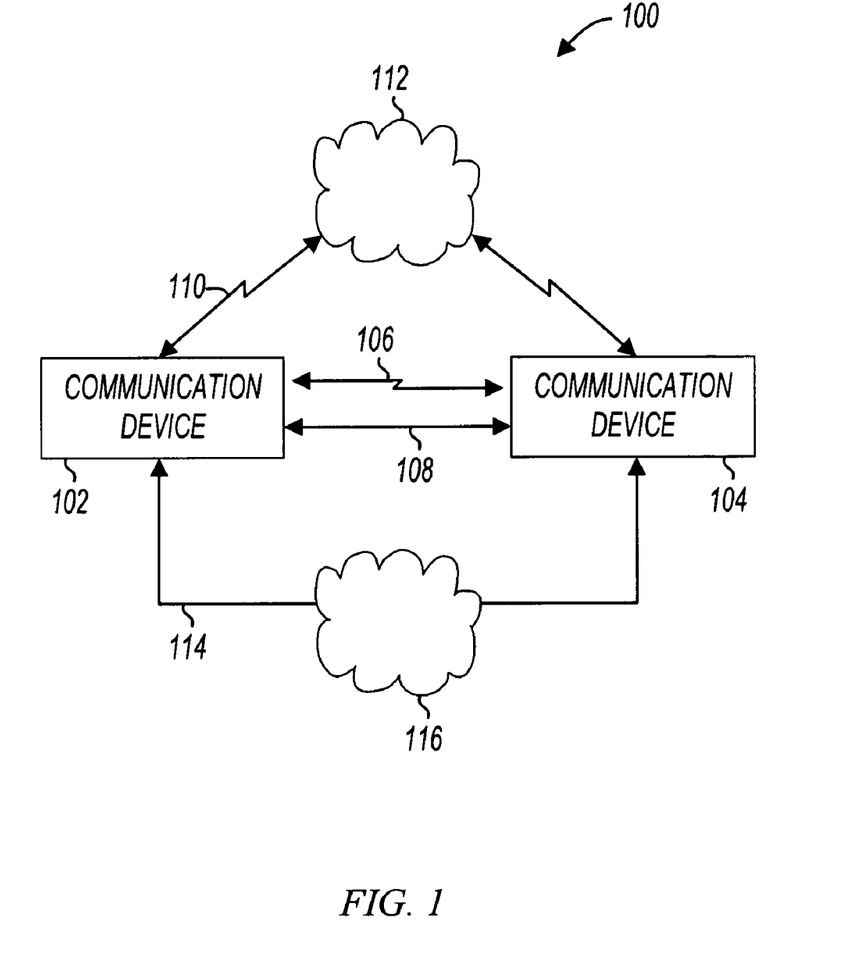
FIG. 1 is a simplified block diagram of a communication system, in accordance with an example embodiment.

FIG. 1 is simplified block diagram of a communication system 100, in accordance with an example embodiment. System 100 includes multiple communication devices 102, 104. Although only two devices 102, 104 are illustrated for purposes of simplicity, system 100 may include many communication devices.

A device 102, 104 may be mobile, portable or stationary. For example, a device 102, 104 may include a laptop computer, a desktop computer, a server, a mainframe computer, a cellular telephone, a personal data assistant (PDA), a printer, a wireless computer peripheral (e.g., a keyboard, a pointing device, etc.), a consumer electronics device (e.g., a television, a game system peripheral, etc.) or any other electronic device with the capability of communicating using a frame-based communication protocol.

Devices 102, 104 may communicate with each other directly, such as through a direct wireless link 106 or wired link 108. Alternatively or in addition, devices 102, 104 may communicate with each other indirectly through a wireless network 112 or a wired network 116, via wireless links 110 or wired links 114, respectively. For example, but not by way of limitation, networks 112, 116 may include a local area network (LAN), a wide area network (WAN) a wireless LAN (WLAN), a radio area network (RAN), a personal area network (PAN) (e.g., a Bluetooth network), a cellular network, a satellite network, or any combination thereof. For example, but not by way of limitation, embodiments may be implemented in any WLAN system or device that supports an Institute of Electrical and Electronics Engineers (IEEE) 802.x Standard (e.g., IEEE Std 802.11-1997, 802.11e, 802.15, 802.16, 802.3, etc.).

Devices 102, 104 may communicate with each other or with networks 112, 116 using unidirectional or bi-directional links. Accordingly, each device 102, 104 may be adapted to operate as a source device, a destination device, or both.

Figure 2:
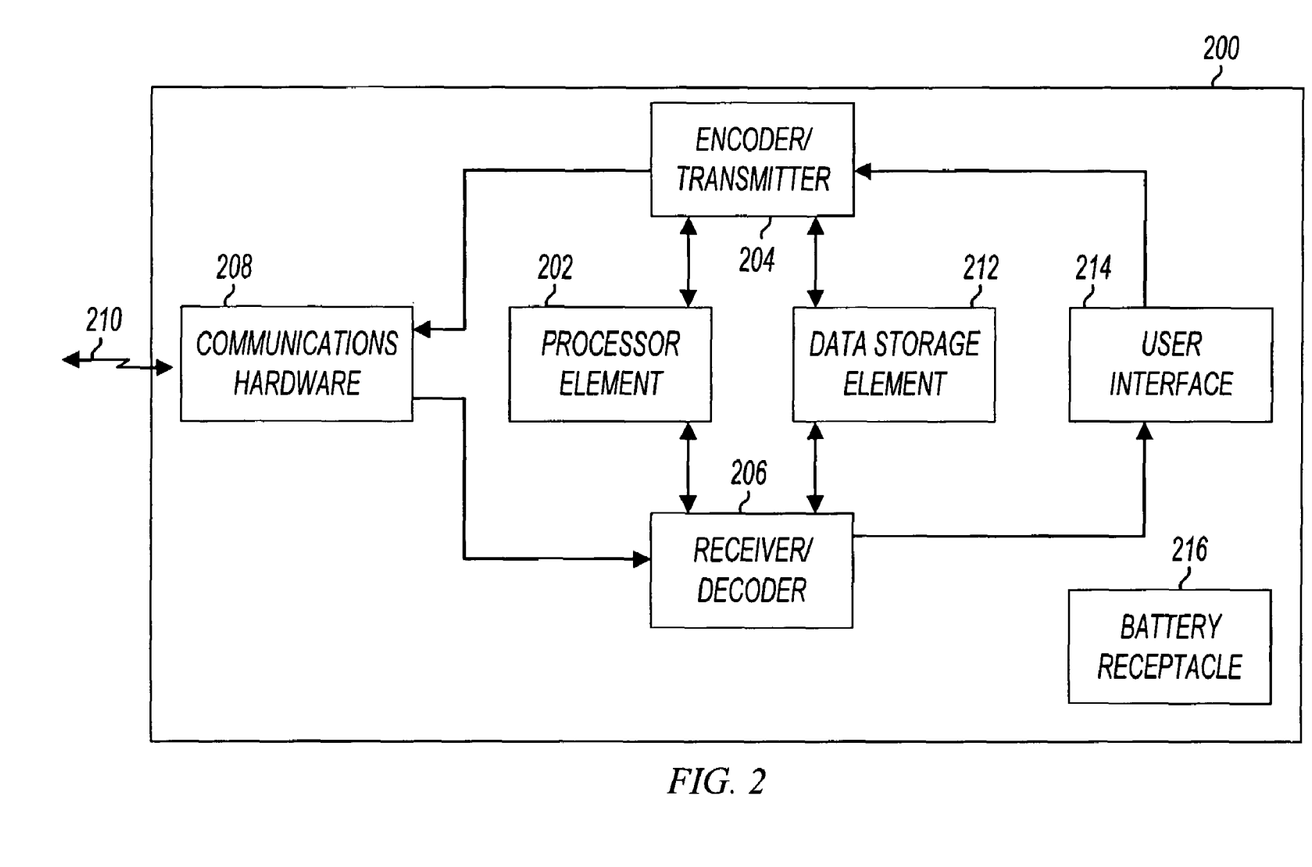
FIG. 2 is a simplified block diagram of a communication device, which includes an encoder/transmitter and a receiver/decoder, in accordance with an example embodiment.

FIG. 2 is simplified block diagram of a communication device 200, which includes an encoder/transmitter and a receiver/decoder, in accordance with an example embodiment. Device 200 includes at least one processor element 202, encoder/transmitter 204, and receiver/decoder 206. Processor element 202 may include one or more general-purpose or special-purpose processors, application specific integrated circuits (ASICs), other discrete or integrated circuits, or combinations thereof. Processor element 202 may perform any of a number of functions, including but not limited to, data processing (e.g., creating, consuming, or otherwise processing data), voice processing, communications control functions, and device control functions, among other things.

Because device 200 includes both an encoder/transmitter 204 and a receiver/decoder 206, device 200 may support bi-directional communications. In other embodiments, device 200 may include only an encoder/transmitter or a receiver/decoder, but not both. In such embodiments, device 200 may operated as a source device or a destination device, respectively, but may not support bi-directional communications.

In an embodiment, device 200 also includes communications hardware 208, which enables device 200 to send and receive data frames over one or more communications links 210. In a particular embodiment, communications hardware 208 includes one or more antennas (e.g., a dipole, patch, omni-directional or other type of antenna), which enables communications over a wireless link 210 (e.g., over an air interface). When an infrared specification is implemented, communications hardware 208 may include one or more light-emitting diodes (LEDs) (not shown) or other optical transmission device. In alternate embodiments, communications hardware 208 may provide access to a wired link (not illustrated).

Device 200 further may include one or more data storage elements 212, which may be accessible to processor element 202, encoder/transmitter 204 and/or receiver/decoder 206. Data storage element 212 may include, for example, one or more volatile or non-volatile storage media, including read only memory (ROM), random access memory (RAM), hard disk, removable storage media (e.g., CD ROM, digital video disk, floppy disk), magnetic cassettes, memory cards or sticks, other storage media, or combinations thereof. Data storage element 212 may permanently or temporarily store, for example, data and computer-executable instructions, among other things.

In an embodiment, device 200 also may include one or more user interfaces 214. For example, but not by way of limitation, a user interface 214 may include a keyboard, keypad, pointing or selection device, speaker, microphone, display device, or combinations thereof. Further, device 200 also may include one or more battery receptacles 216. Accordingly, with a properly-charged battery installed, device 200 may operate without access to a continuous source of power (e.g., in the case of a portable electronic device), or may operate when an interruption occurs to a continuous source of power. In various alternate embodiments, device 200 may include additional or different elements than those illustrated in FIG. 2, and/or the elements may be differently arranged.

Figure 3:
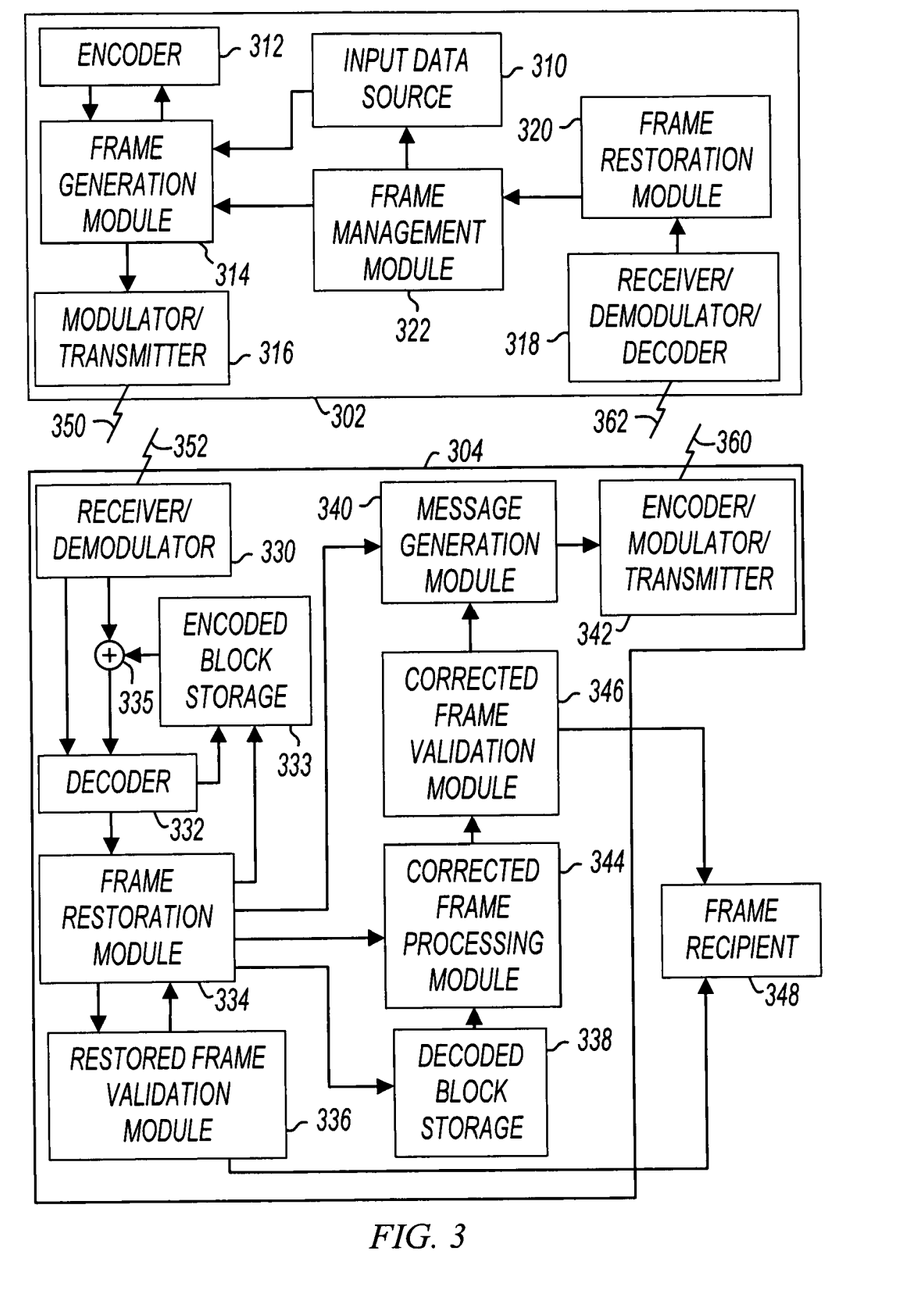
FIG. 3 is a simplified block diagram showing functional elements of a source device and a destination device, in accordance with an example embodiment.

FIG. 3 is simplified block diagram showing functional elements of a source device 302 and a destination device 304, in accordance with an example embodiment. As mentioned previously, a particular device may be adapted to operate as both a source device and a destination device. However, for clarity of explanation, the functionalities of a source device and a destination device have been divided, in FIG. 3, into separate devices 302, 304.

Apparatus elements and processes according to various embodiments of the inventive subject matter include: 1) a source device sending an initial data frame, that includes multiple blocks encoded for forward error correction (FEC), over a communications channel to a destination device; 2) the destination device decoding the multiple blocks, restoring the received frame, and identifying corrupted blocks within the restored frame; 3) the destination device sending a message to the source device, which identifies the corrupted blocks; 4) the source device sending a responsive data frame to the destination device, which includes one or more retransmitted data blocks corresponding to the one or more corrupted data blocks; 5) the destination device receiving retransmitted encoded data blocks and combining them with encoded data blocks from the initial data frame; 6) the destination device decoding the combined encoded data blocks resulting in newly decoded data blocks; and 7) the destination device producing a corrected data frame from the one or more newly decoded data blocks and previously-sent, uncorrupted data blocks.

As will be apparent, based on the description herein, implementation of various embodiments may enable corrupted data blocks to be retransmitted, rather than retransmitting entire frames. Further, combining multiple versions of received encoded data blocks prior to decoding may effectively reduce a code rate of a FEC encoder, thereby increasing bit energy-to-noise power spectral density (PSD) ratio, without requiring a different decoder at the destination device. Accordingly, robust communications may be achieved while conserving bandwidth used for retransmitting corrupted information.

To facilitate understanding of processing flows according to various embodiments, the description of FIG. 3, below, begins with a description of a source device 302, proceeds to a description of a destination device 304, returns to a further description of the source device 302, and then returns to a further description of the destination device 304.

In an embodiment, source device 302 includes an input data source 310, an encoder 312, a frame generation module 314, a modulator/transmitter 316, a receiver/demodulator/decoder 318, a frame restoration module 320, and a frame management module 322.

Input data source 310 may include, for example, one or more addressable data storage elements within which source information is stored. The ultimate source of data may be a higher level protocol implemented within the source device, or may be some other local or remote source of data. In response to one or more data selection commands, which identify specific data to be included within a frame, input data source 310 may provide source information to frame generation module 314. In an embodiment, the data selection commands may be provided by frame management module 322, described later, or by another module.

The source information for a particular frame is received by frame generation module 314. In an embodiment, frame generation module 314 is to assemble, for transmission to a destination device, an initial data frame. The initial data frame includes a plurality of encoded data blocks and a frame header. In an embodiment, the frame header may be received from frame management module 322, described later, or from another module.

In an embodiment, frame generation module 314 calculates a checksum value for the source information received for the frame, which is referred to herein as a data checksum value. In a further embodiment, frame generation module 314 calculates a checksum value for the header, which is referred to as a header checksum value. In alternate embodiments, either or both the header checksum calculation or the data checksum calculation may be excluded.

Encoder 312 receives the source information from frame management module 322 (or from input data source 310) and the data checksum value, and encodes the source information and data checksum value, resulting in a plurality of encoded data blocks. In addition, in an embodiment, encoder 312 receives and encodes the header and header checksum value.

In an embodiment, encoder 312 implements a block code encoding technique to encode data (also referred to herein as "block encoding"). For example, but not by way of limitation, the block encoding technique may include a low density parity check (LDCP) encoding technique. Other block encoding techniques may be used in other embodiments. In order to provide an additional mechanism to check for errors and, in some cases, to correct errors, block encoding introduces redundancy to a block of data. Block encoding performed on a block of data produces a "codeword" or "encoded data block." Because of the added redundancy, an encoded data block may include more bits than the input block of data from which the encoded data block was produced.

Encoder 312 provides the plurality of encoded data blocks to frame generation module 314, which then assembles the initial data frame.

Figure 4:
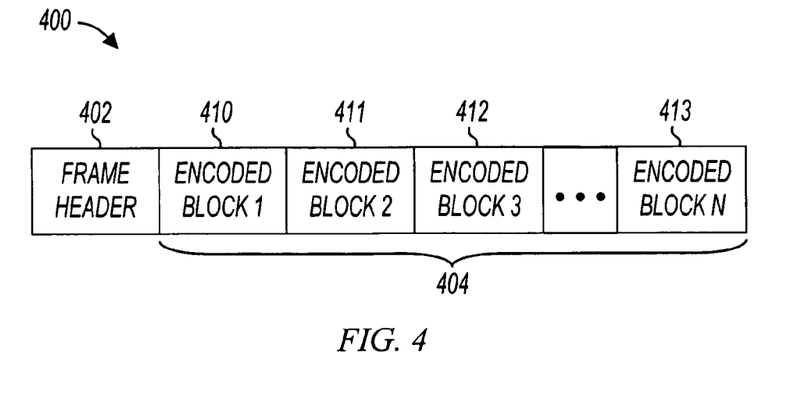
FIG. 4 is a diagram illustrating an initial data frame, in accordance with an example embodiment.

FIG. 4 is diagram illustrating an initial data frame 400, in accordance with an example embodiment. As used herein, a "frame" means a data unit that includes a frame header 402 and a frame body 404, in an embodiment. Frame body 404 may be a variable-length or fixed-length field, and may include one or more encoded blocks 410, 411, 412, 413. Further, each block may include from one to many bytes of data. For example, a frame body may include 28 blocks, where each block may include 56 bytes. The example numbers given are arbitrary, and a frame body may include more or fewer blocks, and a clock may include more or fewer bytes. Further, some or all blocks within a frame may include different numbers of bytes.

In a further embodiment, frame 400 may also include a frame check sequence and/or a header check sequence (not illustrated). In an embodiment, the frame check sequence (FCS) and the header check sequence may contain the result of applying mathematical algorithms (e.g., a CCITT CRC-16 or CRC-32 polynomial) to the frame body 404 and the frame header 402, respectively. In an embodiment, the frame check sequence is encoded with the frame data (e.g., last block 413, or with another block), and the header check sequence is encoded with the frame header (e.g., header 402).

In a further embodiment, frame 400 may be a medium access control (MAC) protocol data unit, or MPDU, as defined in a standard specification, such as an IEEE Std. 802.11 specification, for example. In such an embodiment, the MPDU may include a MAC header (e.g., header 402), a frame body (e.g., body 404), and an FCS. The frame body, in turn, may include one or more encoded blocks containing MAC service data units (MSDUs) or protocol service data units (PSDUs) from higher layer protocols.

Referring back to FIG. 3, frame generation module 314 produces a digital representation of the initial data frame. The initial data frame may or may not be encrypted, prior to transmission. For example, but not be way of limitation, a frame may be encrypted using a Wired Equivalent Privacy (WEP) algorithm, or another type of encryption algorithm.

Modulator/transmitter 316 receives the initial data frame, modulates the frame, and transmits the frame over a communications link 350 (e.g., a wired or wireless link). Accordingly, the initial data frame may also be referred to herein as the initial sent data frame.

Modulator/transmitter 316 may include one or more filters, a modulator, and other apparatus for implementing the particular physical layer specifications supported by the source device 302. Further, in an embodiment in which source device 302 is a wireless device, modulator/transmitter 316 may include one or more antennas (e.g., dipole, patch, omni-directional, or other types of antennas, not illustrated) for transmitting the modulated frames over the air interface. In other embodiments in which source device 302 communicates over a wired connection, modulator/transmitter 316 may include a network interface suitable to placing information on the wired network.

In an embodiment, destination device 304 includes a receiver/demodulator 330, a decoder 332, an encoded block storage element 333, a combiner element 335, a frame restoration module 334, a restored frame validation module 336, a decoded block storage element 338, a message generation module 340, an encoder/modulator/transmitter 342, a corrected frame processing module 344, and a corrected frame validation module 346.

Receiver/demodulator 330 receives information from communications link 352. In an embodiment, the information that receiver/demodulator 330 receives over link 352 may include the header and the encoded data blocks associated with the initial sent data frame provided by source device 302.

Link 352 may be the same link as link 350. In other words, a direct connection may exist between the source device 302 and the destination device 304. However, it is to be further understood that, although only links 350, 352 are illustrated between modulator/transmitter 316 and destination device 304, in alternative embodiments, one or more networks and/or intermediate devices may exist between source device 302 and destination device 304.

Receiver/demodulator 330 may include one or more filters, a demodulator, a timing clock recovery device, and other apparatus to implement the particular physical layer specifications supported by the destination device 304. Further, in an embodiment in which destination device 304 is a wireless device, receiver/demodulator 330 may include one or more antennas (e.g., dipole, patch, omni-directional, or other types of antennas, not illustrated) for receiving the modulated frames from the air interface. In other embodiments in which destination device 304 communicates over wired connections, receiver/demodulator 330 may include a network interface suitable to receiving information from the wired network.

Receiver/demodulator 330 provides demodulated, encoded data blocks to decoder 332. Decoder 332 is to decode the encoded data blocks, resulting in a plurality of decoded data blocks. In an embodiment, decoder 332 implements a block decoding technique (e.g., LDPC decoding) to decode data. For example, encoded data blocks provided to decoder 332 may be represented by 1×N vectors of log-likelihood ratios (LLR) of codeword bits.

When signals arising from transmitted, encoded data blocks are received and processed, the redundant information included in the encoded data blocks may be used to identify and/or correct errors in or remove distortion, collectively referred to as "syndromes," from the received signals in order to recover the original, input blocks of data. In an embodiment, this error checking and/or correcting may be implemented by decoder 332 during the decoding process. In the absence of errors, or in the case of correctable errors or distortion, decoding may be used to recover the original input blocks of data, which were encoded by encoder 312.

In the case of uncorrectable errors or distortion in a received data block, the corrupt encoded data block may be stored in encoded block storage 333, and decoder 332 may produce an indication that the original data for that data block cannot be fully recovered. In an embodiment, this indication, referred to herein as a "corrupted block indication," may be used to initiate retransmission of the original input data block corresponding to the unrecoverable data block, as will be explained in more detail below. Decoder 332 provides the corrupted encoded data blocks, if any, to encoded block storage 333, and also provides the plurality of decoded data blocks and the corrupted block indications, if any, to frame restoration module 334. Frame restoration module 334 is to assemble, from the plurality of decoded data blocks, a restored version of the initial data frame. The corrupted encoded data blocks stored in encoded block storage 333 are combined with retransmitted encoded data blocks in subsequent processing (described below) using combiner element 335.

In an embodiment, frame restoration module 334 provides the restored version of the initial data frame to restored frame validation module 336. Restored frame validation module 336 is to perform a validation procedure on the restored version of the initial data frame. In an embodiment, the validation procedure includes calculating a new frame check sequence for the restored data blocks, and comparing the new value with the received frame check sequence in the restored version of the initial data frame (i.e., which value, if uncorrupted, should equal the frame check sequence calculated by the source device and sent along with the initial data frame). A similar validation procedure may be performed for the header, using the header check sequence. In an embodiment, when the validation procedure is successful, then the restored version is to be delivered to a frame recipient 348. In an embodiment, the frame recipient 348 may be an element of the destination device 304, or may form a portion of a separate electronic device.

When the validation procedure is not successful, the restored frame validation module 336 indicates the invalid result, in an embodiment. In an embodiment, frame restoration module 334 is to receive the invalid result indication, and to initiate a block error identification procedure, in response. In another embodiment, a different module may initiate a block error identification procedure when the validation procedure is not successful. In still another embodiment, a clock error identification procedure may be implemented regardless of the outcome of the validation procedure (e.g., the error detection and validation procedures may be performed in parallel).

In an embodiment, frame restoration module 334 is to perform a block error identification procedure to identify uncorrupted data blocks and corrupted data blocks within the restored version. In an embodiment, frame restoration module 334 identifies corrupted data blocks based on the corrupted block indications received from decoder 332. In an alternate embodiment, frame restoration module 334 identifies corrupted data blocks based on an evaluation of the data checksum value associated with the received information in the frame body.

In an embodiment, uncorrupted blocks are sent to block storage element 338. Block storage element 338 is to store uncorrupted data blocks identified within the restored version of the initial data frame. Additionally, in an embodiment, the initial data frame header, header check sequence, and frame check sequence value are stored in block storage element.

Corrupted blocks, or identifications of the corrupted blocks, are sent to message generation module 340. Message generation module 340 is to generate, for transmission to the source device 302, at least one message identifying the corrupted data blocks in the received and restored frame. Although this embodiment is described herein, it is to be understood that, in other embodiments, more than one message may be generated to identify the corrupted data blocks within a restored initial data frame.

Figure 5:
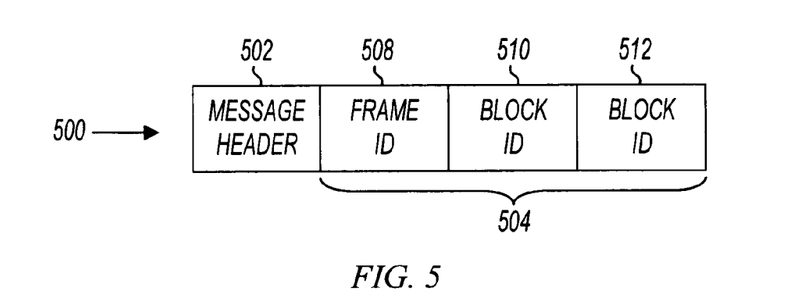
FIG. 5 is a diagram illustrating a corrupted block identification message, in accordance with an example embodiment.

FIG. 5 is diagram illustrating a corrupted block identification message 500, in accordance with an example embodiment. In an embodiment, a corrupted block identification message includes a message header 502 and a message body 504. Message body 504 may include a frame identification (ID) field 508 and one or more block identifications 510, 512, indicating those blocks that were determined to be corrupted. In a further embodiment, message 500 may also include a message body check sequence and/or a message header check sequence, encoded with the message body 504 and header 502, respectively, to enable the source device 302 to perform validation procedure on the message body 504 and header 502.

Frame identification field 508 may include a value, which enables the source device 302 to determine which previously-sent frame the corrupted block identifiers correspond to. For example, but not by way of limitation, frame identification field 508 may include the sequence number associated with the frame (e.g., a sequence number received in the frame header). In addition, if the frame was sent in fragments, frame identification field 508 may additionally include the fragment number.

Block identifications 510, 512 may include the block numbers, within the restored initial data frame, corresponding to the corrupted blocks. For example, referring back to FIG. 4, when destination device 304 determines that blocks 410 and 412 are corrupted, block identifications 510, 512 may include the values 1 and 3, indicating that the first and third blocks are corrupted. Although only two block identifications 510, 512, are shown in FIG. 5, more or fewer block identifications may be included in message 500, according to how many blocks were determined to be corrupted.

Referring back to FIG. 3, message generation module 340 provides a corrupted block identification message to encoder/modulator/transmitter 342. Encoder/modulator/transmitter 342 then encodes, modulates, and transmits the message over a link 360. For purposes of simplicity, encoder/modulator/transmitter 342 are shown as a single module. It is to be understood that encoding, modulating, and transmitting may be carried out by distinct modules.

Referring again to source device 302, receiver/demodulator/decoder 318 receives the information corresponding to the corrupted block identification message from communication link 362. Link 362 may be the same or different from link 360, as previously explained in conjunction with links 350, 352. Receiver/demodulator/decoder 318 then demodulates and decodes the information, in an embodiment.

The decoded information is received by frame restoration module 320, in an embodiment, which is to restore the corrupted block identification message. In an embodiment, the message additionally may be validated.

The corrupted block identification message is sent to frame management module 322, which is to process the message. In an embodiment, frame management module 322 identifies the previously-sent source information, based on the frame identification and one or more block identifications included within the message. In an embodiment, frame management module 322 provides a data selection command to input data source 310, which indicates the data associated with the frame and block identifications. Input data source 310, in turn, provides the selected source information to frame generation module 314.

Frame generation module 314 may calculate a data checksum value for the information, and provide the information and the checksum (if calculated) to encoder 312. In an embodiment, encoder 312 encodes the information, and provides the encoded data blocks to frame generation module 314. These data blocks may be referred to as retransmitted data blocks. In an alternative embodiment, the source device may have previously stored encoded versions of the data blocks, and may retrieve the encoded versions, rather than encoding them again. Frame generation module 314 is to assemble a responsive data frame for transmission to the destination device 304.

Figure 6:
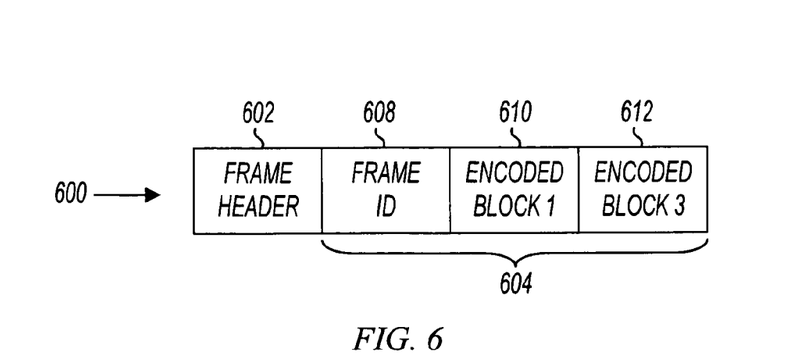
FIG. 6 is a diagram illustrating a responsive data frame, in accordance with an example embodiment.

FIG. 6 is a diagram illustrating a responsive data frame 600, in accordance with an example embodiment. Responsive data frame 600 includes a frame header 602 and a frame body 604, in an embodiment. In addition, a responsive data frame 600 may also include a frame check sequence and/or a header check sequence, encoded with the frame body 604 and frame header 602, respectively, to enable the destination device to validate the frame body 604 and/or the frame header 602 of the responsive data frame 600.

Frame header 602 may include an indication that the responsive data frame 600 includes retransmitted data blocks. This indication may be inherent, for example, in a message-type field (e.g., a frame control field) included within frame header 602.

Frame body 604 includes an initial data frame identification field 608 and one or more encoded blocks 610, 612, in an embodiment. Initial data frame identification field 608 may include a value to enable the destination device 304 to correlate the retransmitted blocks with previously-stored uncorrupted data blocks (e.g., blocks stored in block storage element 338, FIG. 3). For example, the initial data frame identification field 608 may include the sequence number of the previously-sent initial data frame. Encoded blocks 610, 612 correspond to the data blocks that were identified as being corrupted in the corrupted block identification message, in an embodiment. Although only two encoded blocks 610, 612 are illustrated, frame body 604 may include more or fewer blocks.

Referring back to FIG. 3, frame generation module 314 produces a digital representation of the responsive data frame. The responsive data frame may or may not be encrypted, prior to transmission. Modulator/transmitter 316 receives the responsive data frame, modulates the frame, and transmits the frame over a communications link 350.

Referring again to destination device 304, receiver/demodulator 330 receives information from communications link 352. In an embodiment, the information that receiver/demodulator 330 receives over link 352 may include the header and encoded data blocks associated with the responsive data frame provided by source device 302.

Receiver/demodulator 330 provides demodulated, encoded data blocks to combiner element 335. Combiner element 335 also receives stored encoded data blocks from encoded block storage 333. In some embodiments, the retransmitted encoded data blocks and the stored data blocks are represented as 1×N vectors of log-likelihood ratios (LLR) of codeword bits. In some embodiments, combiner element 335 combines the LLR vector of each retransmitted data block with the corresponding LLR vector of a previously received data block. This operation is shown in equation 1:

$$LLR = LLR_{stored} + LLR_{retransmitted} \qquad \text{Eq. (1)}$$

Where $LLR_{stored}$ is an LLR vector in encoded block storage 333, $LLR_{retransmitted}$ is a retransmitted LLR vector corresponding to the same data block, and '+' denotes vector summation. The LLR vector created by combiner 335 is then provided to decoder 332. Decoder 332 is to decode the encoded data blocks represented by the combined LLR vector, resulting in one or more newly decoded data blocks. Decoder 332 provides the one or more newly decoded data blocks to frame restoration module 334.

Frame restoration module 334 is to assemble a restored version of the responsive data frame. In an embodiment, frame restoration module 334 may provide the restored version of the responsive data frame to corrected frame processing module 344. Corrected frame processing module 344 is to produce a corrected data frame. In an embodiment, corrected frame processing module 344 identifies the previously-received, initial data frame. In addition, in an embodiment, corrected frame processing module 344 retrieves the previously-stored header, header check sequence, and frame check sequence for the previously-received, initial data frame. Corrected frame processing module 344 then assembles a corrected frame from the header, the header check sequence, the frame check sequence, the uncorrupted data blocks, and the one or more data blocks decoded from a combination of original, corrupted data blocks and retransmitted data blocks.

In an embodiment, corrected frame processing module 344 sends the corrected frame to corrected frame validation module 346, for validation. In an alternative embodiment, corrected frame processing module 344 sends the corrected frame to restored frame validation module 336. When the validation procedure is not successful, then in one embodiment, the destination device 304 generates and sends a frame retransmission request to the source device 302. In response, the source device 302 may retransmit the entire frame. In another embodiment, rather than sending a frame retransmission request, then the corrected frame may be processed by the frame restoration module 334, which once again may detect corrupted blocks, store corrupted and uncorrupted blocks, send another corrupted block identification message to the source device 302, and the entire process may iterate. When the validation procedure is successful, then the corrected frame is to be delivered to frame recipient 348. The destination device 304 may also send a frame acknowledgement message to the source device 302, indicating that the frame was received without errors.

The various embodiments represented by FIG. 3 provide incremental forward error correction (FEC) redundancy without actually reducing the code rate of the FEC encoder and decoder. In LDPC embodiments, an arbitrary reduction in code rate is achieved by combining LLR vectors of previous data blocks with LLR vectors of retransmitted code blocks. Any number of retransmitted code blocks may be combined, thereby providing an arbitrary amount of incremental redundancy.

It is to be understood that the modules and elements illustrated in FIG. 3 are included to facilitate explanation of various embodiments, and accordingly FIG. 3 intentionally excludes depictions of elements relating to other functions that may be performed by devices 302, 304 (e.g., voice or data processing functions, user interface functions, etc.). In addition, although various modules and elements are shown as distinct from each other in FIG. 3, source device 302 and/or destination device 304 may include more, fewer, or different modules and elements, in other embodiments, and/or the modules and elements may be differently arranged and combined to produce substantially similar results.

Figure 7:
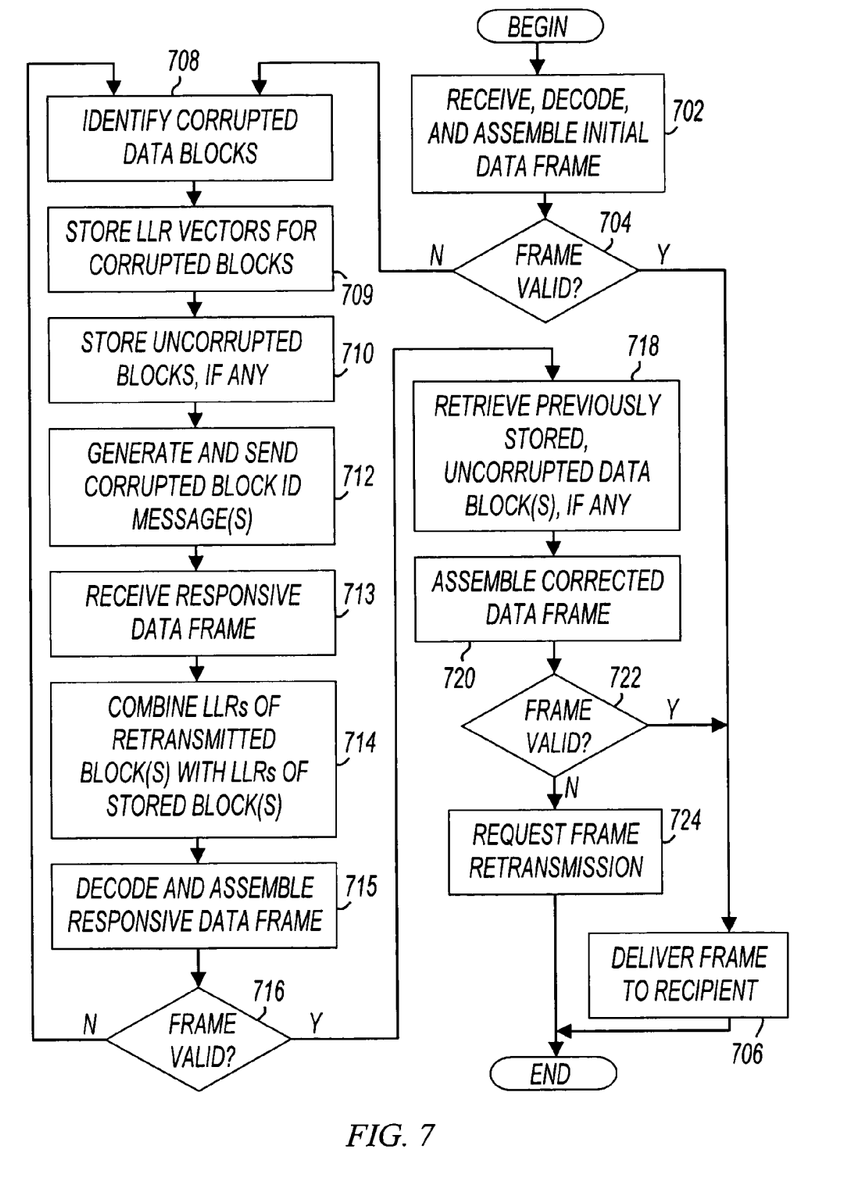
FIG. 7 is a flowchart of a method for a destination device to correct a data frame, in accordance with an example embodiment.
Figure 8:
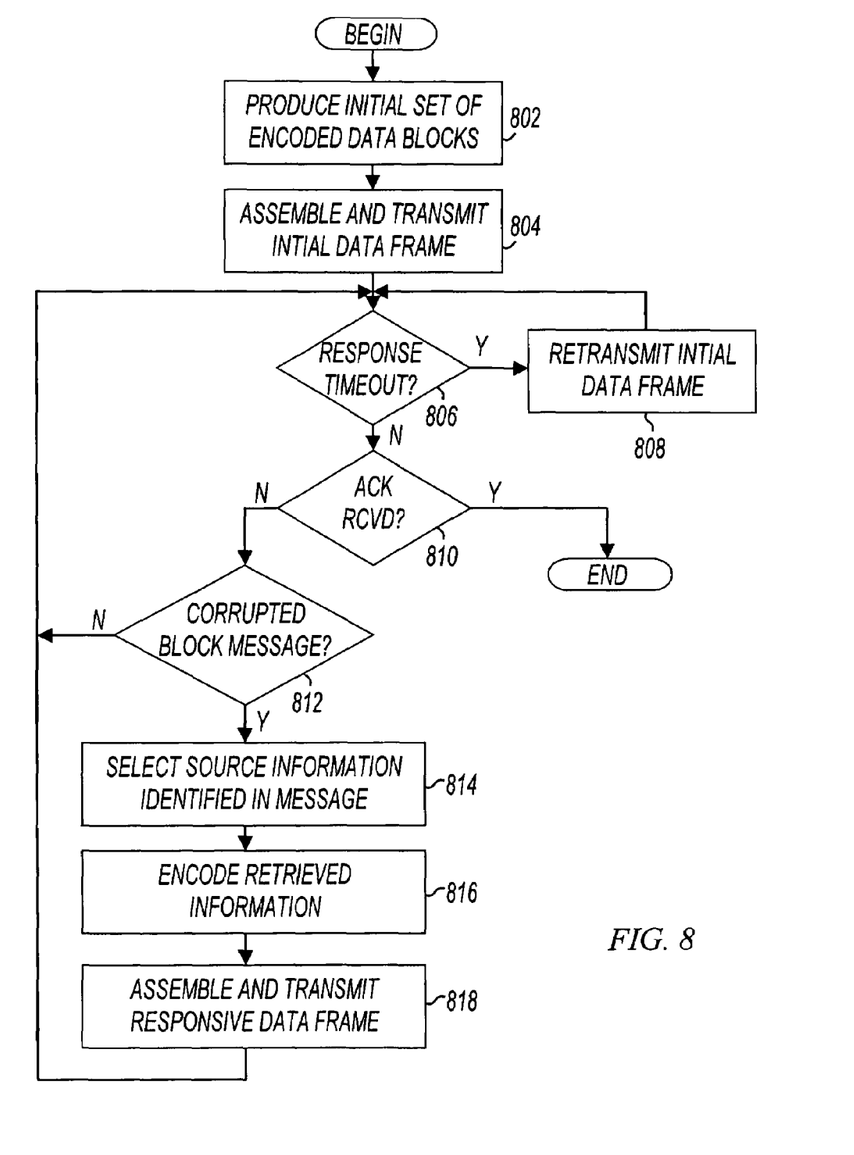
FIG. 8 is a flowchart of a method for a source device to selectively retransmit identified data blocks, in accordance with an example embodiment.

FIGS. 7 and 8 include flowcharts of methods performed by a destination device (e.g., device 304, FIG. 3) and a source device (e.g., device 302, FIG. 3), respectively. More particularly, FIG. 7 is a flow chart of a method for a destination device to correct a data frame, in accordance with an example embodiment.

The method begins, in block 702, when a destination device receives, from a source device, signals corresponding to a frame of encoded data blocks received over a communications channel. Upon receipt, the device decodes the encoded data blocks, resulting in a plurality of decoded data blocks. In an embodiment, the decoding process may produce one or more indications of corrupted data blocks. From the plurality of decoded data blocks, the device assembles a restored version of an initial data frame.

In block 704, a validation procedure is performed. In an embodiment, this includes calculating a frame check sequence for the frame body of the restored version of the initial data frame, and comparing the calculated frame check sequence with a received frame check sequence for the frame. A similar validation procedure may be performed for the header, using the header check sequence. If the frame is determined to be valid, then it is delivered to the frame recipient, in block 706, and the method ends.

If the frame is determined to be not valid, then in block 708, corrupted data blocks are identified within the restored version. In an embodiment, the corrupted data blocks are identified as the data blocks corresponding to the one or more indications of corrupted data blocks, which indications were produced during the decoding process.

In block 709, LLR vectors corresponding to corrupted blocks are stored for subsequent combining operations, and in block 710, uncorrupted data blocks, if any, are stored. In addition, in an embodiment, the header, header check sequence, and frame check sequence from the restored version of the initial data frame are also stored, for subsequent use.

In block 712, at least one corrupted block identification message is generated and sent to the source device. The message identifies a subset of the plurality of decoded data blocks, where the subset corresponds to the corrupted data blocks identified in block 708. In an embodiment, identification of the subset of corrupted data blocks is identified by including, in the message, a frame sequence value and the block numbers for the corrupted data blocks.

In block 713, the destination device receives, from the source device, information corresponding to a responsive data frame. The responsive data frame includes retransmitted encoded data blocks corresponding to the data blocks that were previously found to be corrupted. In block 714, LLR vectors of the retransmitted encoded data blocks are combined with LLR vectors of stored blocks.

In block 715, the combined LLR information is decoded, and the responsive data frame is assembled. In an embodiment, the responsive data frame includes one or more data blocks that correspond to the previously identified corrupted blocks. In an embodiment, a validation procedure is performed for the responsive data frame. In block 716, if it is determined that the responsive data frame is not valid, the procedure may iterate, by identifying corrupted data blocks (block 708), storing combined LLR vectors for corrupted data blocks (block 709), storing uncorrupted data blocks (block 710), generating and sending corrupted block identification messages (block 712), and so on. This process may be repeatable for a finite number of iterations before a request for the entire frame is sent, or the frame is dropped.

In block 716, if it is determined that the responsive data frame is valid, then previously-stored, uncorrupted blocks are retrieved, if any had been stored, in block 718. In an embodiment, the previously-stored header, header check sequence, and frame check sequence also may be retrieved.

A corrected frame is then produced, in block 720, by assembling the retrieved header, header check sequence, frame check sequence, uncorrupted blocks, and the retransmitted blocks. In an embodiment, a validation procedure is performed for the corrected frame. In block 722, if it is determined that the corrected frame is valid, then the corrected frame may be delivered to the frame recipient, in block 706, and the method ends.

If it is determined, in block 722, that the corrected frame is not valid, then the destination device generates and sends a request for frame retransmission, in block 724, and the method ends. In an alternative embodiment, the destination device may determine corrupted blocks within the corrected frame, and may repeat the process of identifying corrupted data blocks (block 708), storing combined LLRs for corrupted data blocks (block 709), storing uncorrupted data blocks (block 710), generating and sending corrupted block identification messages (block 712), and so on. This process may be repeatable for a finite number of iterations before a request for the entire frame is sent, or the frame is dropped.

FIG. 8 is a flowchart of a method for a source device (e.g., device 302, FIG. 3) to selectively retransmit identified data blocks, in accordance with an example embodiment. In an embodiment, the method begins, in block 802, by the source device selecting source information corresponding to a frame from an input data source, and producing a plurality of encoded data blocks. In an embodiment, encoding includes applying a block encoding technique to the source information. In other embodiments, other encoding techniques may be used.

In block 804, the source device assembles an initial data frame, which may include a header and the encoded data blocks, in an embodiment. The initial data frame is then modulated and transmitted to the destination device. The source device may then wait for a response from the destination device.

In an embodiment, a determination is made, in block 806, whether a response timeout period has expired. If so, then the source device retransmits the initial data frame, in block 808, and the method iterates as shown. If not, then a determination is made, in block 810, whether a frame acknowledgement message has been received, indicating that the frame was received without errors. If so, the method ends.

If a frame acknowledgement message has not been received prior to the timeout, then a further determination is made, in block 812, whether a corrupted block identification message has been received. If not, then the method iterates as shown.

If a corrupted block identification message has been received, then in block 814, the source device processes the message. In an embodiment, this includes selecting a subset of the initial input information from the input data source, where the subset corresponds to the corrupted data blocks identified by the destination device in the corrupted block identification message. In block 816, the source device produces one or more encoded data blocks for retransmission, in an embodiment. The data blocks may be referred to as retransmitted data blocks. In an alternative embodiment, the source device may have previously stored encoded versions of the data blocks, and may retrieve the encoded versions, rather than encoding them again.

In block 818, the source device assembles a responsive data frame, which includes a header and the retransmitted data blocks, in an embodiment. The source device then modulates and transmits the responsive data frame, and the method iterates as shown in FIG. 8.

The operations described above, with respect to the methods illustrated and described herein, can be performed in different orders from those disclosed. Also, it will be understood that, although some methods are described as having an "end," they may be continuously performed.

Thus, various embodiments of methods, apparatus, and systems have been described which enable robust data communications, while conserving bandwidth. The foregoing description of specific embodiments reveals the general nature of the inventive subject matter sufficiently that others can, by applying current knowledge, readily modify and/or adapt it for various applications without departing from the generic concept. Therefore such adaptations and modifications are within the meaning and range of equivalents of the disclosed embodiments. The phraseology or terminology employed herein is for the purpose of description and not of limitation. Accordingly, the inventive subject matter embraces all such alternatives, modifications, equivalents and variations as fall within the spirit and broad scope of appended claims.

The various procedures described herein can be implemented in hardware, firmware, and software. Software implementations can use microcode, assembly language code, or a higher-level language code. The code may be stored on one or more volatile or non-volatile computer-readable media may include hard disks, removable magnetic disks, removable optical disks, magnetic cassettes, memory cards or sticks, digital video disks, RAMs, ROMs, and the like.

In the foregoing description of various embodiments, reference is made to the accompanying drawings, which form a part hereof and show, by way of illustration, specific embodiments in which the inventive subject matter may be practiced. Various embodiments are described in sufficient detail to enable those skilled in the art to practice the inventive subject matter, and it is to be understood that other embodiments may be utilized, and that process or mechanical changes may be made, without departing from the scope of the inventive subject matter.

Such embodiments of the inventive subject matter may be referred to, individually and/or collectively, herein by the term "invention" merely for convenience and without intending to voluntarily limit the scope of this application to any single invention or inventive concept if more than one is, in fact, disclosed. It will be recognized that the methods of various embodiments can be combined in practice, either concurrently or in succession. Various permutations and combinations will be readily apparent to those skilled in the art.

What is claimed is:

1. An apparatus comprising:
   an encoded block storage element to store a log-likelihood ratio (LLR) vector corresponding to a data block received as corrupted;
   a vector addition unit to add the LLR vector corresponding to the data block received as corrupted with an LLR vector of a retransmitted data block;
   a low density parity check (LDPC) decoder responsive to the vector addition unit;
   a decoded block storage element to store decoded data blocks received as uncorrupted; and
   a corrected frame processing module to combine decoded data blocks from the decoded block storage element with decoded data blocks received from the LDPC decoder.

2. The apparatus of claim 1 further comprising a corrected frame validation module to validate a corrected frame received from the corrected frame processing module.

3. The apparatus of claim 1 further comprising a message generation module to generate messages to request retransmission of encoded data blocks.

4. An electronic system comprising:
   an omni-directional antenna;
   a receiver coupled to the omni-directional antenna;
   an encoded block storage element to store a log-likelihood ratio (LLR) vector corresponding to a data block received as corrupted;
   a vector addition unit to add the LLR vector corresponding to the data block received as corrupted with an LLR vector of a retransmitted data block;
   a low density parity check (LDPC) decoder responsive to the vector addition unit; a decoded block storage element to store decoded data blocks received as uncorrupted; and
   a corrected frame processing module to combine decoded data blocks from the decoded block storage element with decoded data blocks received from the LDPC decoder.

5. The electronic system of claim 4 further comprising a corrected frame validation module to validate a corrected frame received from the corrected frame processing module.

* * * * *